3,654,322
REACTION OF A CARBOXYLIC ACID ANHYDRIDE WITH AN ETHYLENICALLY UNSATURATED HYDROCARBON
Donald M. Fenton, Anaheim, Calif., assignor to Union Oil Company of California, Los Angeles, Calif.
No Drawing. Filed June 10, 1969, Ser. No. 831,981
Int. Cl. C07c *51/54*
U.S. Cl. 260—398                                   16 Claims

ABSTRACT OF THE DISCLOSURE

A carboxylic acid anhydride is contacted with an ethylenically unsaturated hydrocarbon under liquid phase conditions in the presence of a Group VIII noble metal catalyst at temperatures between 100° and 300° C. and pressures sufficient to maintain liquid phase conditions. The ethylenically unsaturated hydrocarbon reacts with the anhydride to replace the hydrocarbon group of the anhydride. The reaction is especially useful in converting branched-chain anhydrides to straight-chain anhydrides.

DESCRIPTION OF THE INVENTION

The invention relates to the production of carboxylic acid anhydrides. More particularly, the invention relates to a method of converting a branched-chain anhydride to a straight-chain anhydride and/or to increasing the number of carbon atoms of an anhydride.

It is known in the art that carboxylic acid anhydride can be produced by contacting an ethylenically unsaturated hydrocarbon, a carboxylic acid and carbon monoxide in an inert liquid medium with a Group VIII noble metal in complex association with a biphyllic ligand. A mixture of straight-chain and branched-chain anhydrides is formed. The straight-chain anhydrides are generally more valuable than the branched-chain anhydrides and, unfortunately, in the above hydrocarboxylation process, substantial amounts of branched-chain anhydrides are produced. As will be seen from the discussion hereinafter, my invention can be utilized to produce straight-chain anhydrides from branched-chain anhydrides and it, therefore, can be used in combination with the hydocarboxylation process to increase the yield of straight-chain anhydrides.

It is an object of this invention to increase the yield of straight-chain anhydrides in the hydrocarboxylation process.

It is also an object of this invention to provide an economic process for production of higher anhydrides.

Other and related objects will be present from the following description of the invention.

The invention comprises contacting a carboxylic acid anhydride with a mono or di-ethylenically unsaturated hydrocarbon in the presence of a Group VIII noble metal catalyst in complex association with a biphyllic ligand under liquid phase reaction conditions and at temperatures between 100° and 300° C. The unsaturated hydrocarbon reacts with the anhydride so as to replace the hydrocarbon group of the anhydride according to the following exemplary reaction:

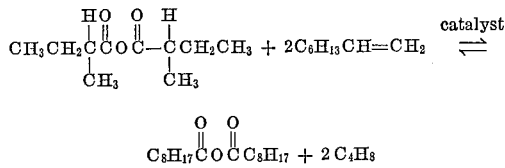

As is apparent from the above reaction, the straight-chain alpha olefin (octene-1) replaces the alkyl group (sec-butyl) of the anhydride. Accordingly, the lower, branched-chain anhydride is converted to a higher, straight-chain anhydride. The butene by-product can be transferred to a hydrocarboxylation reaction zone to react with a carboxylic acid and carbon monoxide to form an anhydride.

The anhydride reactant of the invention may be an anhydride having at least one hydrogen on the carbon beta to the carbonyl carbon and having the following general structure:

wherein R is alkyl, or monocyclic cycloalkylalkyl, or aralkyl having 2 to 25 carbons, preferably 2 to 15 carbons. Anhydrides of fatty acids are preferred, i.e., R is alkyl.

Examples of suitable anhydrides contemplated herein are propionic anhydride, butyric anhydride, isobutyric anhydride, valeric anhydride, hexanoic anhydride, heptanoic anhydride, lauric anhydride, myristic anhydride, palmitic anhydride, stearic anhydride, 3-cyclohexyllauric anhydride, 4-phenylmyristic anhydride, benzoic anhydride, 5-phenyl - 4 - cyclohexyllauric anhydride, 6-butyl-5-cycloheptylstearic anhydride, acetic-propionic mixed anhydride, acetic acid-butyric mixed anhydride, acetic-myristic mixed anhydride, acetic acid-butyric mixed anhydride, acetic-myristic mixed anhydride, valeric-stearic mixed anhydride, etc. The above anhydrides may be formed outside the reaction zone by, for example, a hydrocarboxylation process or "in situ" by, for example, contacting acetic anhydride with a carboxylic acid corresponding to the acid of the desired anhydride.

The ethylenically unsaturated hydrocarbon (hereinafter referred to as "unsaturated hydrocarbon" or "hydrocarbon") reacted with the anhydride has one double bond or two unconjugated double bonds, has 2 to 25 carbons, preferably 2 to 15 carbons and has the following general structure:

$$R_2C=CR_2$$

wherein R is hydrogen or the same or different hydrocarbon selected from the class consisting of alkyl, alkenylmethylene and monocyclic cycloalkyl, aryl or aralkyl.

The unsaturated hydrocarbon is preferably an alpha mono-unsaturated hydrocarbon, i.e., $R_1R_2C=CH_2$. Most preferably the hydrocarbon is an olefin, i.e. R is hydrogen or alkyl. Preferred olefins are alpha olefins having at least one hydrogen on the beta carbon, i.e., $RCH=CH_2$. The diolefins, preferably those having a double bond on an alpha carbon, are the preferred di-ethylenically unsaturated hydrocarbons.

Examples of suitable unsaturated hydrocarbons are ethylene; propylene; butene; isobutene; pentene; isopentene; hexene; 2-methyl-1-hexene; heptene; 2-methyl-1-pentene; decene; dodecene; heptadecene; eicosene; tetracosene; 2,3-dipropyl - 1 - heptadecene 1,4-pentadiene; 2,7-decadiene; vinylcyclohexene; styrene; alpha-methyl styrene; 1,1-diphenylhexene; 3-phenylhexene-1; 4-phenyl - 3,8 - eicosadiene; etc. Examples of preferred alpha olefins are propylene, butene-1, pentene-1, heptene-1, decene-1, pentadecene-1, etc.

The invention may be utilized in a variety of methods, A branched-chain anhydride may be converted to a straight-chain anhydride by contact with a straight-chain alpha olefin, e.g., contacting 2-methyloctanoic anhydride with octene-1. A lower anhydride (an anhydride of an acid having 3 to 7 carbons) may be converted to a higher anhydride by contact with a higher unsaturated hydrocarbon, e.g., contacting propionic anhydride with decene-1. In a more specific embodiment, a lower branched-chain anhydride may be converted to a higher, straight-chain anhydride by contacting the lower anhydride with a higher straight-chain alpha olefin, e.g., contacting isobutyric anhydride with heptadecene-1.

In another embodiment, a mixed anhydride may be converted to a symmetrical anhydride by contacting the mixed anhydride with an unsaturated hydrocarbon corresponding to the desired hydrocarbon group of the anhydride. For example, lauric acid-butyric acid mixed anhydride may be converted to lauric anhydride by contact with undecene.

In still another embodiment, an anhydride of a fatty acid, e.g., stearic anhydride, may be converted to an anhydride having aryl and/or cycloalkyl groups by contacting the fatty acid anhydride with an unsaturated hydrocarbon containing said groups, e.g., contacting stearic anhydride with 3-phenyloctene or with 4-cyclohexyl-2-methyldodecene, etc. Also, a saturated anhydride may be converted to an unsaturated anhydride by contact with a di-ethylenically unsaturated hydrocarbon, e.g., contacting octanoic anhydride with 1,5-heptadecadiene. In all the embodiments, the product anhydride may be subsequently hydrolyzed to the corresponding carboxylic acid if desired.

The invention may also be advantageously employed for converting acetic anhydride to a more valuable anhydride by incorporating a lower $C_3$–$C_5$ fatty acid such as propionic, butyric, or valeric acid, in the reaction zone. Acetic anhydride, the $C_3$–$C_5$ acid, and a higher unsaturated hydrocarbon, e.g., octene-1, are contacted with the complex catalyst with the acetic anhydride converted "in situ" to an anhydride intermediate conforming to the requirements described hereinabove. The anhydride intermediate is simultaneously converted to a more valuable anhydride according to the reaction of the invention.

The catalyst of the invention comprises a Group VIII noble metal, preferably in complex with a biphyllic ligand. The Group VIII noble metal may be ruthenium, rhodium, palladium, osmium, iridium, or platinum and is preferably palladium. A catalytic quantity of the metal is added (e.g., 0.002–2% of the reaction medium) and the metal may be added as a soluble salt, a carbonyl, a hydride or as a chelate. Examples of suitable sources of the noble metals are as follows: iridium carbonyl chloride, iridium carbonyl hydride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaamminorhodium(III) chloride, rhodium dicarbonyl chloride dimer, rhodium nitrate, rhodium trichloride, rhodium carbonyl hydride, rhodium(1)chloride, ruthenium trichloride, tetra-amminorutheniumhydroxychloro chloride; etc.

A biphyllic ligand is a compound having at least one atom with a pair of electrons capable of forming a coordinate covalent bond with a metal atom and simultaneously having the ability to accept the electron from the metal, thereby imparting additional stability to the resulting complex. The biphyllic ligand can comprise an organic compound having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R)_3$$

wherein E is trivalent phosphorus, arsenic antimony or bismuth; and
wherein R is the same or different alkyl having 1 to about 10 carbons, monocyclic cycloalkyl having 4 to about 10 carbons, and/or monocyclic aryl having 6 to about 10 carbons; examples of which are methyl, butyl, nonyl, cyclohexyl, cyclodecyl, phenyl, tolyl, xylyl, tetramethylphenyl, etc. Preferably at least one R is aryl, e.g., phenyl, tolyl, xylyl, etc., and, most preferably, the ligand is triaryl.

Examples of suitable biphyllic ligands have the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)phosphine, phenyldiisopropylphosphine, phenyldiamylphosphine, ethyldiphenylphosphine, phenylditolylphosphine, xylyldiphenylarsine, tolyldi(m-xylyl)stibine, trixylylphosphine, trixylylarsine, trixylylstibine, cyclopentyldixylylstibine, dioctylphenylphosphine and tridurylphosphine, etc. Of the aforementioned, the aryl phosphines and particularly the triarylphosphines (e.g., triphenylphosphine) are preferred because of their greater activity.

The Group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300%) of that stoichiometrically required to form a complex with the Group VIII noble metal. The complex has from 1 to about 5 moles of biphyllic ligand per atom of the metal and other components such as hydride, or soluble anions such as sulfate, nitrate, $C_1$–$C_5$ carboxylates, e.g., acetate, propionate, isobutyrate, valerate, halide, etc. may be but need not be included in the complex catalyst of this invention. These components may be incorporated in the catalyst by the formation of the catalyst complex from a Group VIII noble metal salt of the indicated anions. A preferred complex is one comprising one halide or one $C_1$–$C_5$ carboxylate ligand since these groups, particularly halide, improve the reactivity of the catalyst.

The reaction may be performed in the presence of a liquid organic medium inert to the reactants and to the reaction conditions, and preferably having a solvency for the reactants and the catalyst. Suitable reaction mediums include, for example, alkanes, cycloalkanes, aromatics and ethers. Examples of the foregoing are hexane, heptane, octane, decane, cycloheptane, cyclohexane, benzene, toluene, di-isopropyl ether, di-n-butyl ether, ethylene glycol di-iso-butyl ether, methyl o-tolyl ether, and triethylene glycol diethyl ether, etc.

The reaction can also be conducted in the absence of such liquids by performing the reaction in an excess (2–100 times that stoichiometrically required) of the reactant unsaturated hydrocarbon (if a liquid) and/or reactant anhydride. This can be accomplished for example in the batch process by terminating the reaction prior to most of the hydrocarbon and/or anhydride being consumed or for example in the continuous process by adding sufficient hydrocarbon or anhydride to maintain the desired hydrocarbon or anhydride level.

The reaction can be performed at relatively mild temperatures, e.g., temperatures from about 100° to about 300° C. preferably from about 150° C. to about 250° C. and at pressures between 1 and 100 atmospheres absolute, preferably 6 to 20 atmospheres, sufficient to maintain liquid phase reaction conditions. In a preferred embodiment wherein a lower anhydride, e.g., an anhydride of an acid having 3 to 7 carbons is converted to a higher anhydride, the process is conducted at a relatively high temperature, e.g., 200°–300°C. and/or at a relatively low pressure, e.g., 1–8 atmospheres correlated with temperature so as to vaporize a substantial amount, e.g., 30–100% of the ethylenically unsaturated hydrogen by-product, yet not vaporize the anhydride product. If superatmospheric pressures are used, the requisite pressure may be maintained by the addition of an inert gas, e.g., nitrogen, methane, etc., to the reaction zone. In some instances, the pressure may be maintained by the reactant hydrocarbon if a gas and/or by the pressure exerted by the by-product hydrocarbon if a gas. When the hydrocarbon by-product is a gas, the pressure during the reaction generally increases due to the release of the gaseous olefin and therefore to maintain constant pressure some of the by-product must be vented from the reactor.

The reaction can be performed batchwise or in a continuous fashion. The preferred manner is a batch operation wherein the catalyst, reaction medium (if used) and the anhydride are first introduced into a reaction zone to form a liquid phase. If the unsaturated hydrocarbon is a liquid, it may be introduced simultaneously with the anhydride or at any time prior to heating of the reaction medium. If the hydrocarbon is a gas, the reaction medium, catalyst and anhydride can be introduced into the reaction zone which can then be pressured with the hydrocarbon and heated to the desired reaction temperature. If an inert gas is used it can be introduced before, during or after the unsaturated hydrocarbon introduction. When performing the reaction in a continuous fashion, the reaction medium, reactants and catalyst can be continuously introduced into the reaction zone.

The gaseous by-products can be withdrawn as a separate effluent, cooled, depressured and the inert gas can be recycled for further contacting. The gaseous hydrocarbon by-product can be recycled to a hydrocarboxylation reaction medium for use in the process wherein it is contacted with a carboxylic acid and carbon monoxide to form an anhydride. The liquid anhydride product of this invention can be withdrawn separately from the reaction zone by withdrawing a slip-stream of the liquid reaction medium. The product anhydride may be separated from the mixture by conventional means, e.g., distillation, and the unconverted reaction anhydride, hydrocarbon and the catalyst may be recycled to the reaction zone. If the hydrocarbon by-product is a liquid, it preferably is separated from the unconverted reactants and recycled to a hydrocarboxylation reaction zone for conversion to an anhydride or acid.

As indicated hereinabove, the unsaturated hydrocarbon reactant replaces the hydrocarbon group of the anhydride and an unsaturated hydrocarbon by-product is formed. The unsaturated by-product and product anhydride will reach equilibrium concentration in the reaction when sufficiently long reaction periods are permitted. The product anhydride yield may be favored by removing the by-product unsaturated hydrocarbon from the reaction zone as it is formed, thereby removing it from equilibrium with the reactant and product anhydrides. If the by-product is a gas and the reactant hydrocarbon is a liquid under the process conditions of the reaction zone, by-product removal may be accomplished by circulating the vapor phase through a condenser and separator such that the hydrocarbon is liquefied and separated from the inert gas, if any, which may be recycled to the reaction zone. Where the by-product unsaturated hydrocarbon is a liquid, product anhydride yields may be improved by increasing the recycle rate of the liquid reaction medium to minimize the time in which the by-product and product anhydride are in contact. Product anhydride yields are also favored by conducting the reaction in a large excess of the reactant unsaturated hydrocarbon, e.g., 3-40, preferably 20-40 times that stoichiometrically required. Furthermore, in the case where a lower anhydride is converted to a higher anhydride, high temperatures, e.g., 200-300° C., and/or low pressures, e.g., 1-8 atmospheres, may be employed to vaporize the by-product hydrocarbon yet not vaporize the reactants or product anhydride. In this fashion, the by-product is removed from being in intimate contact with the product anhydride. Any vaporized by-product hydrocarbon is preferably removed from the reaction zone as described above.

The following Examples 1 and 2 demonstrate the results actually obtained by the practice of the invention.

EXAMPLE 1

To a bomb were added ½ gram palladium iodide, 4 grams triphenylphosphine, 100 grams butyric anhydride, and 25 milliliters of octene-1. The bomb was pressured with nitrogen to about 8 atmospheres. The mixture was rocked and heated to and maintained at 175° C. for 2 hours, then heated to and maintained at 200° C. for 2 hours. The pressure at the end of the latter two-hour period was measured and found to be about 30 atmospheres evidencing release of gaseous propylene. The heating was discontinued and the bomb allowed to cool. The bomb was depressured, the contents removed and analyzed to reveal that, after hydrolysis of the anhydride products by the addition of water, 7 grams of alpha-methyloctanoic acid and 3 grams of nonanoic acid were formed. There was also found 50 grams of butyric acid and 40 grams of isobutyric acid.

EXAMPLE 2

To a bomb were added 1.5 grams palladium chloride bistriphenylphosphine, 2.0 grams triphenylphosphine, 50 milliliters acetic anhydride, 25 milliliters octanoic acid and 22.0 grams of propylene. The bomb was pressured with nitrogen to about 8 atmospheres. The mixture was rocked and heated to and maintained at 175° C. for about 6 hours. The heating was discontinued, the bomb allowed to cool, depressured and its contents analyzed to reveal that, after hydrolysis, there was formed, in addition to acetic acid and octanoic acid, ½ gram isobutyric acid and ½ gram of butyric acid.

The following Examples 3 and 4 illustrate other methods presently contemplated that may be employed in the practice of the invention. All parts are on a weight basis.

EXAMPLE 3

This example illustrates how a branched-chain anhydride may be converted to its straight-chain isomer.

To a stirred autoclave may be added ½ part palladium chloride, 5 parts triphenylphosphine, 150 parts 4-butylmyristic anhydride, and 75 parts of heptadecene-1. Nitrogen may be introduced into the autoclave until the pressure is about 12 atmospheres. The reaction medium is heated to and maintained at about 250° C. for about 8 hours. The heating is discontinued and the autoclave allowed to cool. The autoclave is depressured by venting the nitrogen to the atmosphere and the contents removed. It may be observed that stearic anhydride, the straight-chain isomer of 4-butylmyristic anhydride, is formed in the process.

In other applications, 3-phenyl-2-methyllauric anhydride, 4-cyclohexyloctanoic anhydride or 3-ethyl-4-butyldecanoic anhydride may be substituted for 4-butylmyristic anhydride and eicosene-1 may be substituted for heptadecene-1 without substantially changing the illustrated mode of practice.

If it were desired to convert 4-butylmyristic anhydride an an aryl anhydride, 4-phenylhexene-2 may be substituted for heptadecene and if it were desired to convert 4-butylmyristic anhydride to an unsaturated anhydride, 3,6-heptadecadiene may be substituted for heptadecene.

EXAMPLE 4

This example illustrates how the invention may be employed to convert a branched-chain anhydride to a higher molecular weight, straight-chain anhydride, and how the by-product unsaturated hydrocarbon may be utilized in a second hydrocarboxylation reaction.

To a stirred reactor A may be added ¼ part of palladium acetate, 3 parts trixylylphosphine, 75 parts of α-methylbutyric anhydride and 300 parts of normal pentadecene-1. The reactor is pressured by conventional pressure control instruments. The reaction mixture is heated to and maintained at about 200° C. sufficient to vaporize a substantial amount of the butene-2 by-product. The removed vapor is cooled, and butene condensed in a conventional water-cooled heat exchanger and the mixed phase passed to a separator where the liquid butene is separated from nitrogen. The condensed butene-2 by-product is transferred to a second reactor B where it contacts carbon monoxide and valeric acid in a reaction medium containing palladium chloride and triphenylphosphine to form a branched-chain anhydride. The branched-chain α-methylbutyric or α-methylbutyric-valeric mixed anhydride is transferred to a reactor A for further contact with pentadecene-1. Reactor A is allowed to cool, the autoclave depressured and the liquid contents removed. The mixture is passed through a conventional distillation scheme to separate the straight-chain palmitic anhydride product which is sent to storage. Excess pentadecene, catalyst and α-methylbutyric anhydride are recycled to reactor A for use in a next run. The by-product butene-2 is transferred to reactor B for a next run in reactor B.

In an alternate scheme wherein all reactions are conducted in a single reactor, ¼ part of palladium acetate, 3 parts trixylylphosphine, 75 parts of butene-1 and 150 parts of valeric acid may be added to reactor A. The reactor is pressured with carbon monoxide to about 10 atmospheres and the reaction medium heated to and maintained at about 175°–200° C. for 4 hours sufficient to form α-methylbutyric and valeric anhydride. The reaction is terminated and the liquid contents removed and separated by conventional distillation techniques. The straight-chain valeric anhydride is sent to product storage or, depending on the economics, recycled to reactor A. The branched-chain α-methylbutyric anhydride and catalyst, together with make-up palladium acetate and trixylylphosphine are recycled to reactor A. To reactor A is then added a 400% stoichiometric excess of pentadecene-1. The reactor is pressured with nitrogen to 6 atmospheres and heated to and maintained at 200° C. for 5 hours. The heating is discontinued and the higher, straight-chain palmitic anhydride separated from the reaction medium and sent to product storage. The catalyst and by-product butene-2 may be recycled to reactor A to contact valeric acid and carbon monoxide in a next run.

If it were desired to maximize yields of only the straight-chain valeric anhydride rather than the higher, straight-chain palmitic anhydride, n-butene-1 may be substituted for pentadecene-1 in the above illustrated processes.

I claim:

1. A process comprising contacting an ethylenically unsaturated hydrocarbon having one double bond or two unconjugated double bonds, and having 2 to about 25 carbons with an anhydride having at least one hydrogen on a carbon beta to a carbonyl carbon and having the formula:

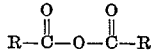

wherein R is alkyl or monocyclic cycloalkyl alkyl or aralkyl having 2 to 25 carbons, in a liquid reaction medium at a temperature between 100° and 300° C. and pressures sufficient to maintain a liquid phase, in the presence of palladium in complex with a biphyllic ligand having the structure:

E(R')₃ wherein E is trivalent phosphorus, arsenic, antimony or bismuth; and

R' is the same or different alkyl having 1 to about 10 carbons, monocyclic cycloalkyl having 4 to about 10 carbons or monocyclic aryl having 6 to about 10 carbons, so as to replace at least one of said R groups of said anhydride with a hydrocarbon radical having the same number of carbons as said ethylenically unsaturated hydrocarbon and form an ethylenically unsaturated by-product having the same number of carbons as said replaced R group.

2. The process of claim 1 wherein said ethylenically unsaturated hydrocarbon is an olefin.

3. The process of claim 2 wherein said olefin is an alpha olefin.

4. The process of claim 3 wherein said alpha olefin is straight-chain and wherein said reactant anhydride is branched-chain.

5. The process of claim 2 wherein said anhydride is an anhydride of a fatty acid.

6. The process of claim 1 wherein said biphyllic ligand is a triarylphosphine.

7. The process of claim 1 wherein said biphyllic ligand is triphenylphosphine.

8. The process of claim 1 wherein said reactant anhydride is an anhydride of a carboxylic acid having 3 to 7 carbons.

9. The process of claim 1 wherein said reactant unsaturated hydrocarbon is an alpha olefin having at least one carbon on a beta carbon, said anhydride is an anhydride of a fatty acid, said Group VIII noble metal is palladium and said biphyllic ligand is triphenylphosphine.

10. The process of claim 1 wherein the reaction is performed in an excess of the reactant anhydride and/or the ethylenically unsaturated hydrocarbon.

11. The process of claim 1 wherein said by-product unsaturated hydrocarbon by-product is reacted with carbon monoxide and a carboxylic acid to produce a carboxylic acid anhydride.

12. The process of claim 1 wherein said reactant anhydride is an anhydride of a C₃–C₅ fatty acid and is formed in said reaction medium by adding acetic anhydride and a C₃–C₅ fatty acid to said medium.

13. A process comprising contacting a hydrocarbon alpha mono-olefin having from 2 to 15 carbon atoms with an anhydride having a hydrogen on a carbon beta to a carbonyl carbon and having the formula:

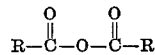

wherein R is an alkyl having from 2 to 15 carbon atoms, in a liquid reaction medium at a temperature between about 100 and 30.° C. and pressure sufficient to maintain liquid phase, in the presence of a palladium catalyst in complex association with a biphyllic ligand having the structure:

E(R')₃ wherein E is trivalent phosphorus, and

R' is the same or different alkyl having 1 to about 10 carbons, monocyclic cycloalkyl having 4 to about 10 carbons, and monocyclic aryl having 6 to about 10 carbons, to replace at least one of said R groups with a hydrocarbon radical having the same number of carbons as said mono-olefin.

14. The process defined in claim 13 wherein said biphyllic ligand is a triaryl phosphine.

15. The process of claim 14 wherein said biphyllic ligand is triphenylphosphine.

16. The process of claim 1 wherein said anhydride is an anhydride of a carboxylic acid having from 3 to 7 carbons.

References Cited

UNITED STATES PATENTS 3,437,676   4/1969   Kutepow et al. _____ 260—468
3,161,672   12/1964  Zachry et al. _____ 260—486

OTHER REFERENCES

Tsuji and Ohno: J.A.C.S., 90, 94–107, 1968.

LORRAINE A. WEINBERGER, Primary Examiner
R. GERSTL, Assistant Examiner

U.S. Cl. X.R.

260—546